J. S. HAGERTY.
Street-Car Pole-Coupling.
No. 162,379. Patented April 20, 1875.
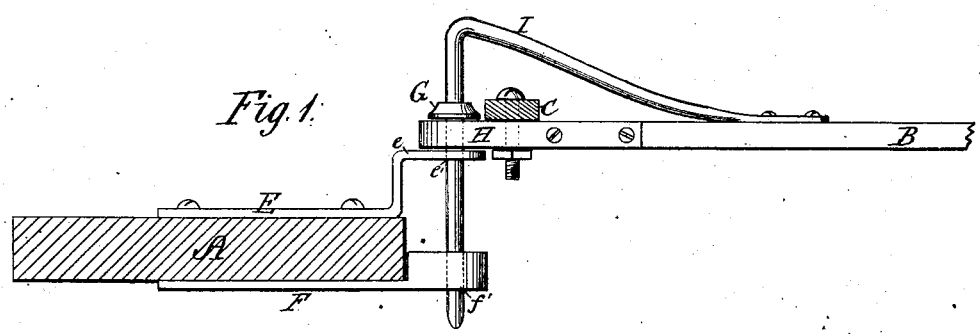
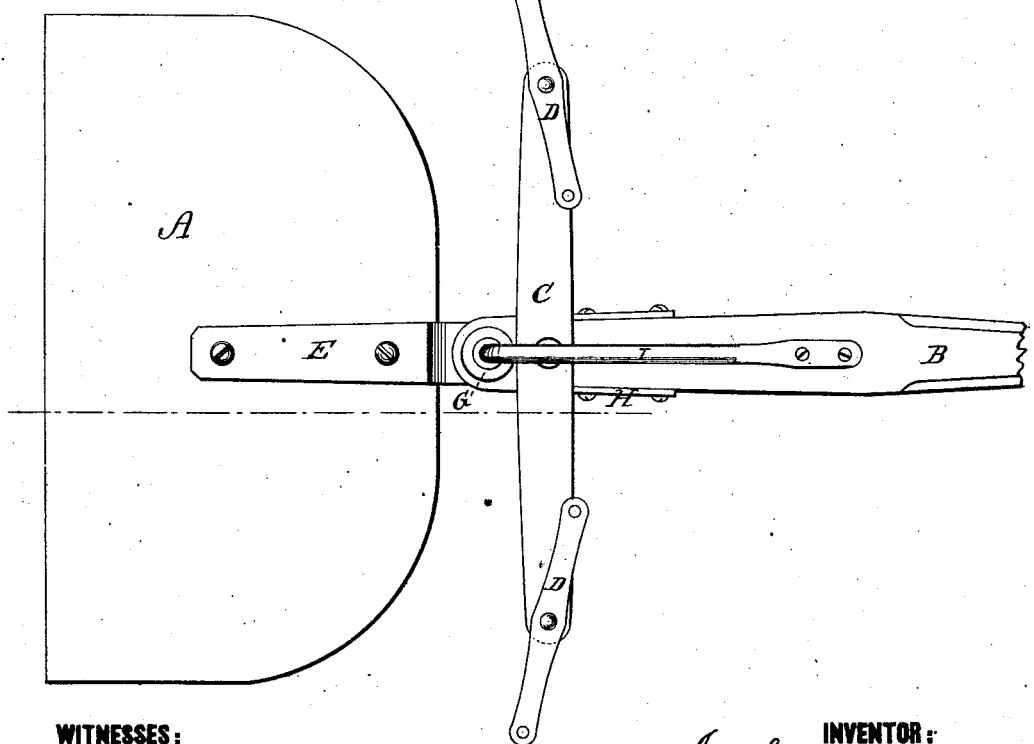
WITNESSES:
INVENTOR:
Jas. S. Hagerty
BY
ATTORNEYS.

UNITED STATES PATENT OFFICE.

JAMES S. HAGERTY, OF BALTIMORE, MARYLAND.

IMPROVEMENT IN STREET-CAR-POLE COUPLINGS.

Specification forming part of Letters Patent No. 162,379, dated April 20, 1875; application filed March 31, 1875.

*To all whom it may concern:*

Be it known that I, JAMES S. HAGERTY, of Baltimore city, State of Maryland, have invented a new and Improved Horse-Car Coupling-Pole; and I do hereby declare that the following is a full, clear, and exact description of the same, reference being had to the accompanying drawing, forming a part of this specification, in which—

Figure 1 is a vertical section; Fig. 2, a plan view.

The invention relates to a certain improvement in coupling the pole to a horse-car, so as to enable it to be held up by the car, and thus take a continuous strain from the necks of the horses; also, to a bent rod which shall be affixed to pole, and serve the double purpose of retaining the coupling-pin in place, and of a handle wherewith the driver, in turning, may conveniently hold up the tongue with one hand, while he handles the reins of his horses with the other.

The features of improvement will first be fully described in connection with all that is necessary to a full understanding thereof, and then pointed out in the claims.

A represents one of the platforms of a horse-car, and B is the tongue, provided with double-tree C and single-trees D D. On the upper part of platform A I attach the twice-bent and right-angled plate E, so as to form the flat-surfaced rest $e$, and on the lower side a stout brace-plate, F, the two plates having corresponding holes $e'$ $f'$ in vertical alignment. The headed pin G is dropped through the superposed tongue-brace H, and each of the plates E F, allowing the tongue to turn readily in a horizontal plane, but preventing the pole from dragging upon the horses' necks, and dropping when one or both of them fall. At the end of a route the car-driver uncouples the tongue or pole, drives the horses around, and couples the pole to the opposite platform. In doing this a great inconvenience is experienced, for the removal of which I have attached, to the upper surface of pole, a bent rod, I, so as at the same time to exert a pressure upon the pin, and prevent it from being jarred out, as so often happens. This rod may merely press upon the top of coupling-pin or form a part thereof, may be a spring, and it, as well as the plates E F, may be held by any suitable fastenings.

Having thus described my invention, what I claim as new is—

1. The combination, with platform and coupling-pin, of the two plates E F, as and for the purpose described.

2. The bent rod I, attached to upper side of pole, and resting upon the head of coupling-pin, all combined as and for the purpose specified.

JAS. S. HAGERTY.

Witnesses:
WM. SMYTH,
C. F. BARNES.